(12) United States Patent
Gurevich et al.

(10) Patent No.: US 10,161,794 B2
(45) Date of Patent: Dec. 25, 2018

(54) SPECTROPHOTOMETER DIAGNOSIS

(71) Applicant: HP INDIGO B.V., Amstelveen (NL)

(72) Inventors: Lena Gurevich, Ness Ziona (IL); Nir Guttman, Ness Ziona (IL); Ran Waidman, Rehovot (IL)

(73) Assignee: HP Indigo B.V., Amstelveen (NL)

( * ) Notice: Subject to any disclaimer, the term of this patent is extended or adjusted under 35 U.S.C. 154(b) by 22 days.

(21) Appl. No.: 15/545,978

(22) PCT Filed: Apr. 29, 2015

(86) PCT No.: PCT/IB2015/000872
§ 371 (c)(1),
(2) Date: Jul. 24, 2017

(87) PCT Pub. No.: WO2016/174490
PCT Pub. Date: Nov. 3, 2016

(65) Prior Publication Data
US 2018/0024003 A1 Jan. 25, 2018

(51) Int. Cl.
*G01J 3/02* (2006.01)
*G01J 3/52* (2006.01)
(52) U.S. Cl.
CPC ............... *G01J 3/027* (2013.01); *G01J 3/524* (2013.01)
(58) Field of Classification Search
CPC ....................................................... G01J 3/027
USPC ......................................................... 356/319
See application file for complete search history.

(56) References Cited

U.S. PATENT DOCUMENTS

| 5,691,817 A | 11/1997 | Cargill et al. |
| 6,351,308 B1 | 2/2002 | Mestha |
| 6,384,918 B1 * | 5/2002 | Hubble, III ............... G01J 3/02 250/226 |
| 6,975,949 B2 | 12/2005 | Mestha et al. |
| 7,259,857 B2 | 8/2007 | Butterfield et al. |
| 7,760,397 B2 | 7/2010 | Hosier |
| 2003/0063275 A1 | 4/2003 | Hubble, III et al. |
| 2012/0044540 A1 * | 2/2012 | Dalal .................... H04N 1/6033 358/1.18 |
| 2012/0092701 A1 | 4/2012 | Wang et al. |
| 2013/0322750 A1 * | 12/2013 | Agarwal .............. G06K 9/4652 382/165 |
| 2015/0049139 A1 * | 2/2015 | Arnabat Benedicto ..................... B41J 11/005 347/19 |

OTHER PUBLICATIONS

Understanding the Role of a Spectrophotometer in a Color Management Process, Canon, Jan. 10, 2013, http://learn.usa.canon.com/resources/articles/2013/ipfx>.

* cited by examiner

*Primary Examiner* — Tarifur Chowdhury
*Assistant Examiner* — Omar Nixon
(74) *Attorney, Agent, or Firm* — HP Inc. Patent Department

(57) ABSTRACT

A spectrophotometer diagnosis system and a method for diagnosing a spectrophotometer, wherein at least one test patch is printed in proximity to at least one non-printed substrate patch, at least one value characteristic of the at least one test patch and/or the at least one substrate patch is measured using the spectrophotometer, and at least one diagnostic score for the spectrophotometer is determined based on the at least one measured value in comparison with a reference value.

20 Claims, 14 Drawing Sheets

SPECTROPHOTOMETER DIAGNOSIS

BACKGROUND

A spectrophotometer may be used in printers. It may be used as a component of the printer calibration and control system. It may serve to detect miscalibrated color properties by analysis of printouts and emit signals to the printer for re-calibration of the printer.

Spectrophotometer malfunction may lead to miscalibration of the printer. For instance, a malfunctioning spectrophotometer may detect miscalibrated color properties despite flawless printing quality (false positive signal). In this case, the well-calibrated printer may be lead to re-calibrate, thereby actually inducing printing defects. Similarly, a malfunctioning spectrophotometer may miss to detect actual miscalibrated color properties (false negative signal). In this case, the miscalibrated printer is not re-calibrated and the printing quality is not improved despite the need for improvement. Therefore, spectrophotometer diagnosis systems and methods, which may detect spectrophotometer malfunctions, are needed.

DETAILED DESCRIPTION OF THE DRAWINGS

Figure 1:
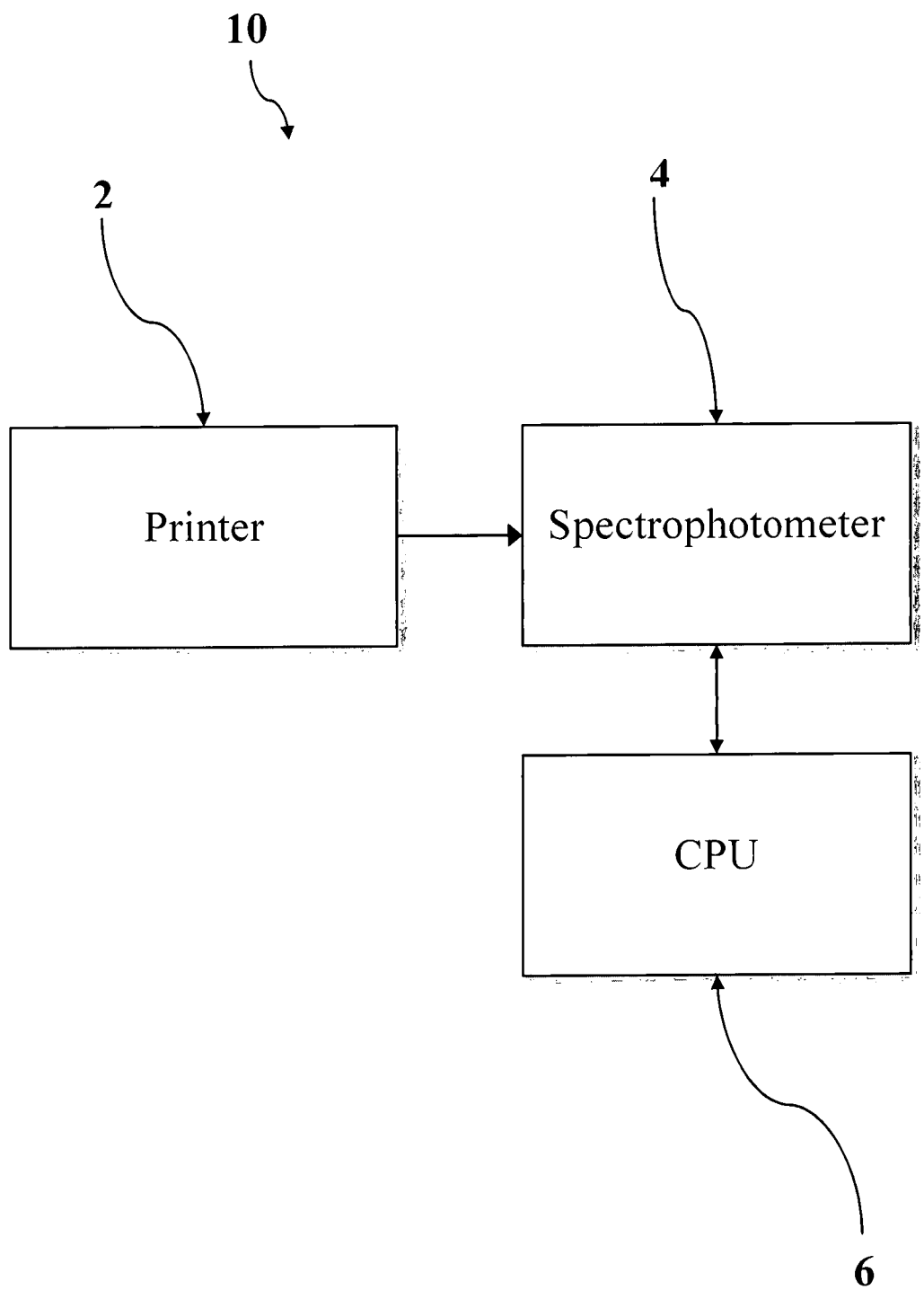
FIG. 1 is a block diagram of an example spectrophotometer diagnosis system consistent with the present disclosure.

Various examples will be described below by referring to the figures. Features with similar properties or functions, which are shown in multiple figures, are referred to by the same reference numerals and will be explained upon their first mention.

An aspect provides a spectrophotometer system comprising a printer, a spectrophotometer, and a processing unit. The printer is configured to print at least one test patch, in proximity to at least one non-printed substrate patch. The spectrophotometer is configured to measure at least one value characteristic of the at least one test patch and/or the at least one substrate patch. The processing unit is configured to determine at least one diagnostic score for the spectrophotometer based on the at least one measured value in comparison with a reference value.

FIG. 1 schematically illustrates an example spectrophotometer diagnosis system 10, comprising a printer 2, a spectrophotometer 4, and a processing unit 6. The printer 2 is configured to print at least one test patch, in proximity to at least one non-printed substrate patch. The spectrophotometer 4 is configured to measure at least one value characteristic of the at least one test patch and/or the at least one substrate patch. The processing unit 6 is configured to determine at least one diagnostic score for the spectrophotometer 4 based on the at least one measured value in comparison with a reference value.

In some examples, the spectrophotometer 4 may be further configured to determine the reference value by measuring a value characteristic of a further one of the at least one test patch and the at least one substrate patch.

Spectrophotometers as described herein may serve to measure values characteristic of illuminated regions. Values may comprise values indicative of a reflectance, an optical density, a color. Color values may be coded in the L*a*b color space or any other color space known in the art. The measured values may be spectral distributions of values indicative of a reflectance, an optical density, a color. Spectral distributions may cover substantially the visible range or portions thereof.

Another aspect provides a method for diagnosing a spectrophotometer. At least one test patch is printed in proximity to at least one non-printed substrate patch. At least one value characteristic of the at least one test patch and/or the at least one substrate patch is measured using the spectrophotometer. At least one diagnostic score for the spectrophotometer is determined based on the at least one measured value in comparison with a reference value. Before proceeding further with a detailed description of example test patches and substrate patches according to FIGS. 2-4 and a first example method according to FIG. 5, further aspects are discussed.

In some examples of the method, the method may comprise determining the reference value by measuring a value characteristic of a further one of the at least one test patch and the at least one substrate patch.

In some examples of the method, values may be measured repeatedly.

In some examples of the method, the at least one diagnostic score may comprise a score indicative of repeatability and/or a score indicative of consistency.

In some examples of the method, determining the at least one diagnostic score may comprise computing a mean value and/or standard deviation of multiple measurements of values characteristic of one or more of the test patches.

In some examples of the method, determining the at least one diagnostic score may comprise comparing a measured value characteristic of one or more test patches to a measured value characteristic of one or more substrate patches.

In some examples of the method, the measured values may comprise a reflectance value, an optical density value and/or a color value.

In some examples of the method, the method may further comprise outputting a diagnosis based on the at least one determined diagnostic score.

Here, if not otherwise specified, the term "test patch" refers to a continuous printed area with substantially uniform printing properties on a substrate. Printing properties comprise color, brightness, opacity, etc. Multiple printed test patches may differ in color, grayscale, number, size, location or any other printing property of test patches or may be substantially identical to each other. The term "test patch" does not imply a particular geometric form. The term "test patch" does not imply the use of a particular printing fluid. Example printing fluids comprise ink, toner, etc.

The term "substrate patch" refers to a continuous non-printed area on a substrate.

The term "printing" refers to the application or deposition or solidification of printing fluid, e.g. onto a planar material in the case of 2D printing or onto a bed of build and support materials in the case of 3D printing.

The term "substrate" refers to both to planar material for 2D printing and to build and support materials for 3D printing. Substrates may be of various sizes, materials, colors etc.

The term "value" refers to a single numerical quantity or to a series or set of numerical quantities, such as a spectrum or spectral distribution.

The term "characteristic" as in "values characteristic of a patch" refers to an association between the value and the patch, such that the value depends on properties of the patch. It does not imply that two patches necessarily yield two different values. For instance, two patches of different color may show the same opacity value.

The term "diagnostic score" may refer to a numerical or binary quantity indicative of the state of the spectrophotometer. A binary diagnostic score may indicate the presence or absence of a malfunction state. Numerical diagnostic scores may indicate a degree of (mal)function on a scale.

Figure 2:
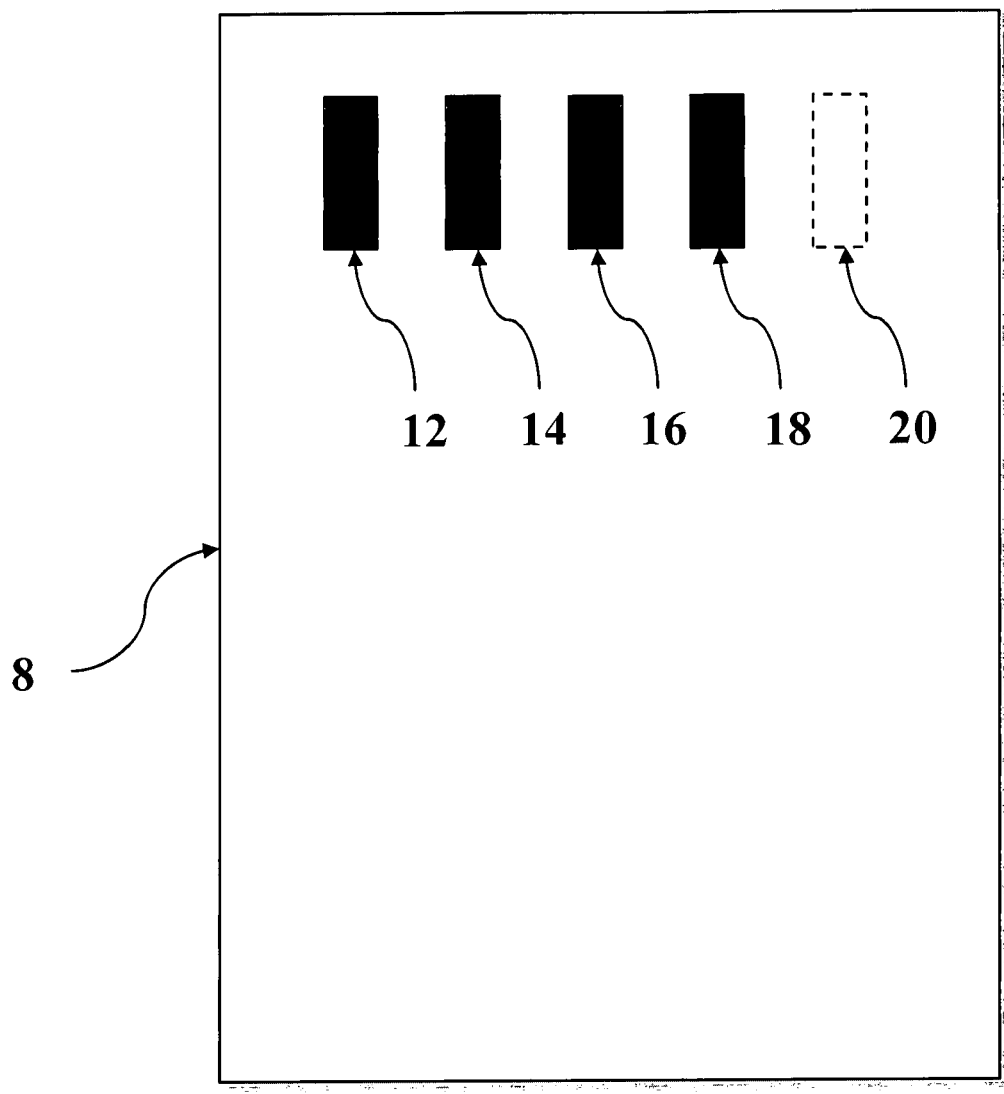
FIG. 2 is an illustration of an example printout of black test patches.

FIG. 2 schematically illustrates an example printout of test patches, printed onto a substrate 8. The substrate shown is a white piece of paper. The illustrated printout features four black test patches 12, 14, 16, 18 and a non-printed substrate patch 20 (illustrated by a dashed line to guide the eye).

Figure 3:
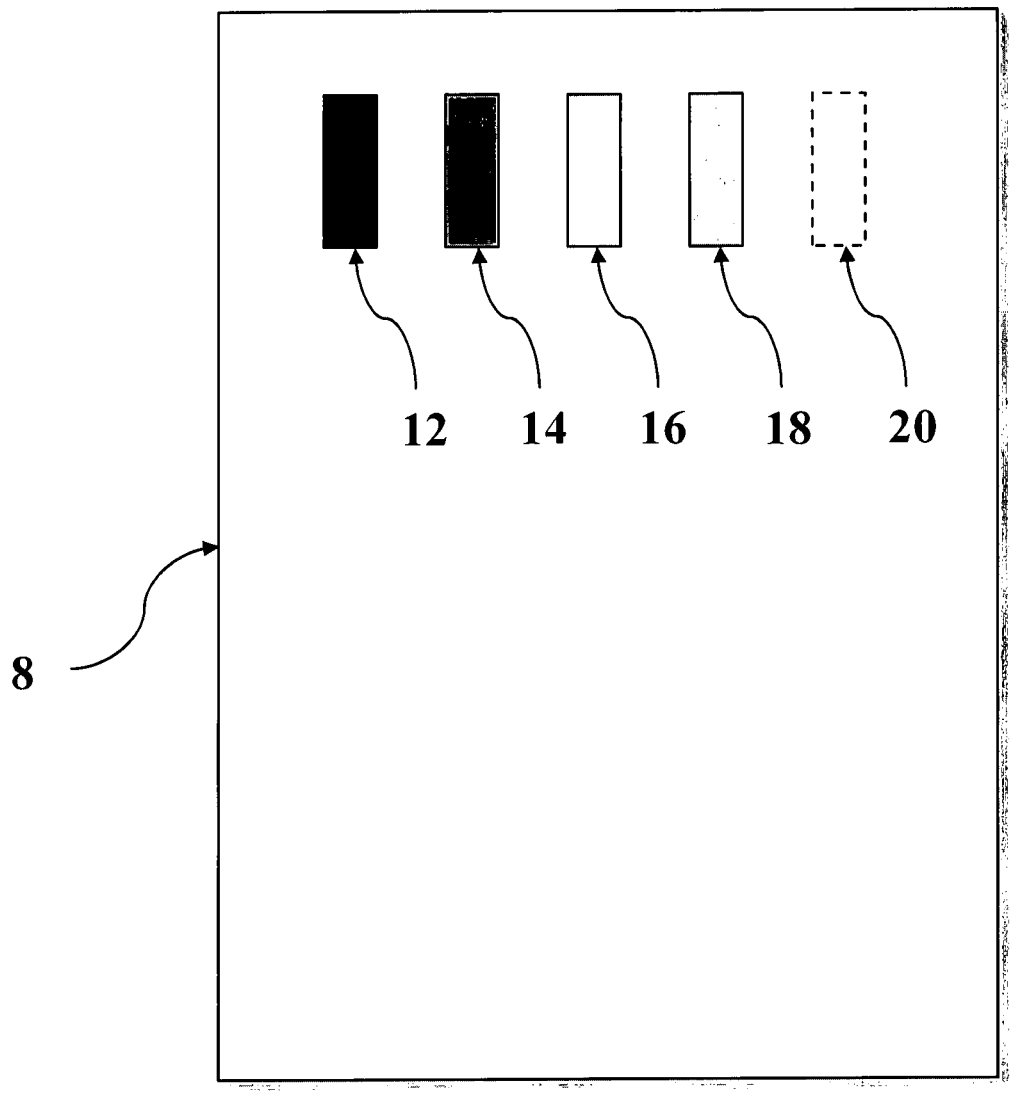
FIG. 3 is an illustration of an example printout of grayscale test patches.

FIG. 3 schematically illustrates another example printout of test patches, printed onto a substrate 8. The printed test patches vary in grayscale color. Test patch 12 is black, test patch 14 is dark gray, test patch 16 is middle gray, and test patch 18 is light gray. Substrate patch 10 is white, as is the substrate 8.

Figure 4:
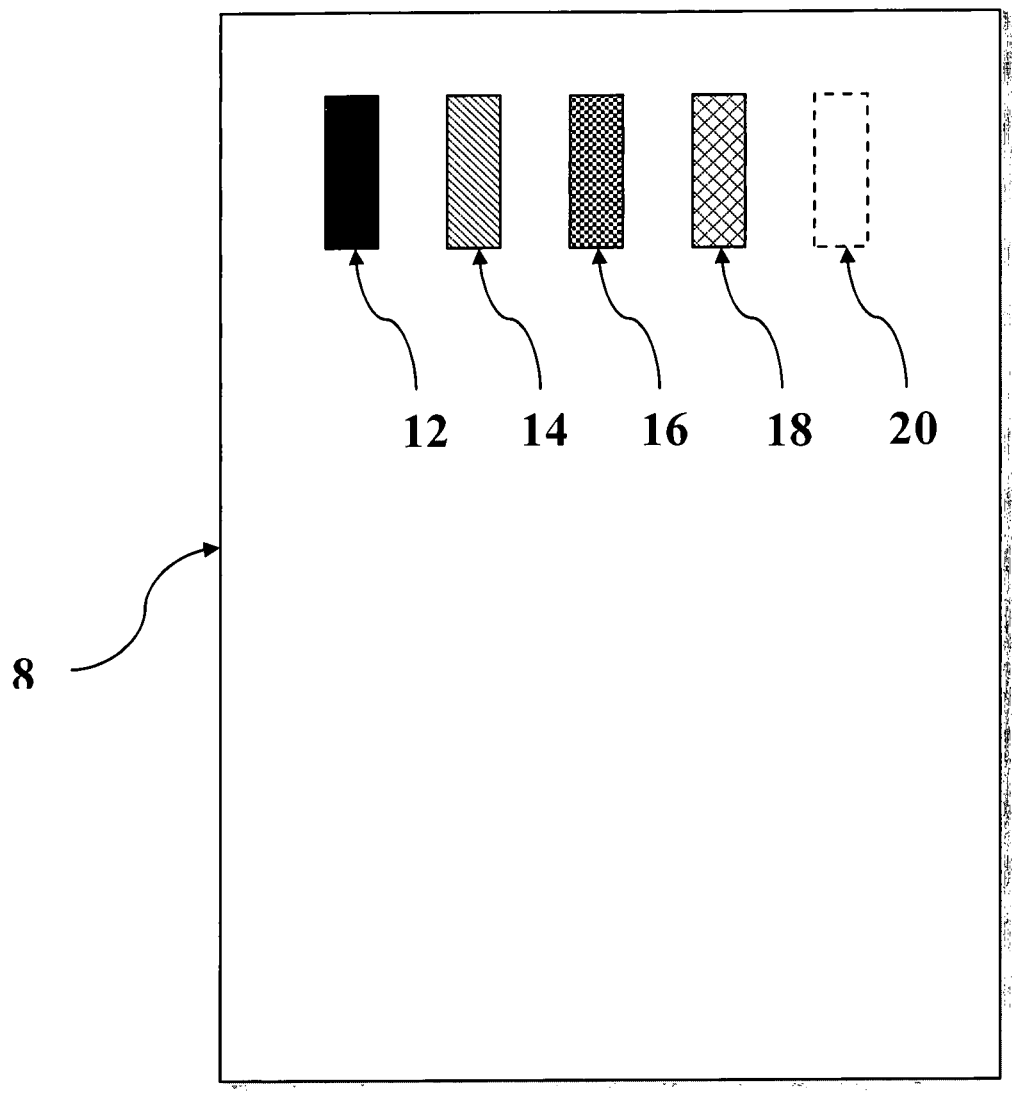
FIG. 4 is an illustration of an example printout of color test patches.

FIG. 4 schematically illustrates another example printout of test patches, printed onto a substrate 8. The printed test patches vary in color. Test patch 12 is black, test patch 14 is green (shown in hatched), test patch 16 is red (shown in checked), and test patch 18 is blue (shown in cross-hatched). Substrate patch 10 is white, as is the substrate 8.

One or more of the illustrated printouts (FIGS. 2-4) may be used by a spectrophotometer diagnosis system for diagnosing a spectrophotometer. In particular, they may have been printed using a printer of the spectrophotometer diagnosis system. They may serve as object of the spectrophotometer to measure values characteristic of at least one of the four test patches 12, 14, 16, 18 and/or the substrate patch 20.

Figure 5:
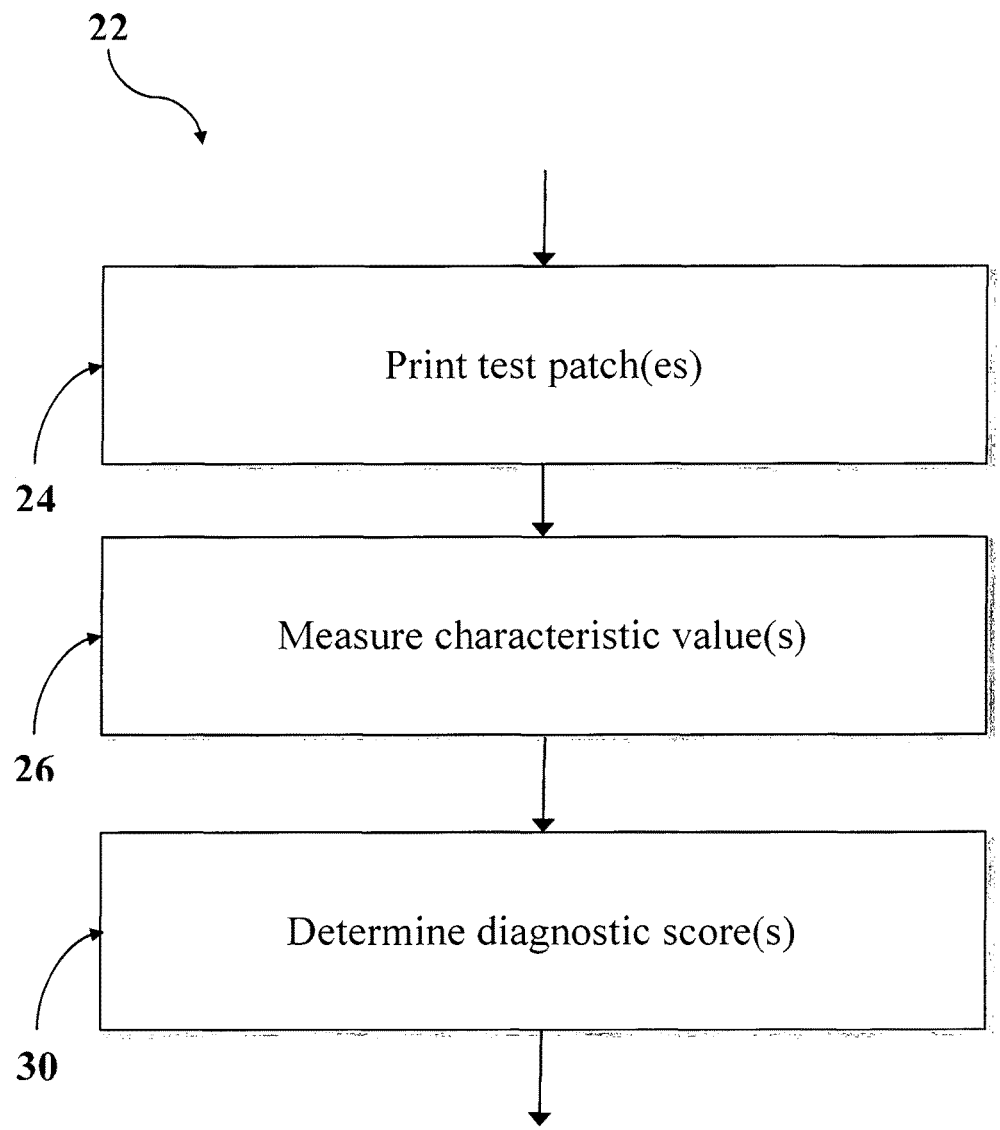
FIG. 5 is a flowchart illustrating an example method for diagnosing a spectrophotometer consistent with the present disclosure.

FIG. 5 illustrates an example method 22 for diagnosing a spectrophotometer. At least one test patch is printed (block 24) in proximity to at least one non-printed substrate patch. At least one value characteristic of the at least one test patch and/or the at least one substrate patch is measured (block 26) using the spectrophotometer. At least one diagnostic score for the spectrophotometer is determined (block 28) based on the at least one measured value in comparison with a reference value.

The reference value can be of one of a variety of origins. For instance, the reference value may be predetermined, may be measured as a value characteristic of a test patch or may be measured as a value characteristic of a substrate patch or may be measured as a value characteristic of multiple patches.

Figure 6:
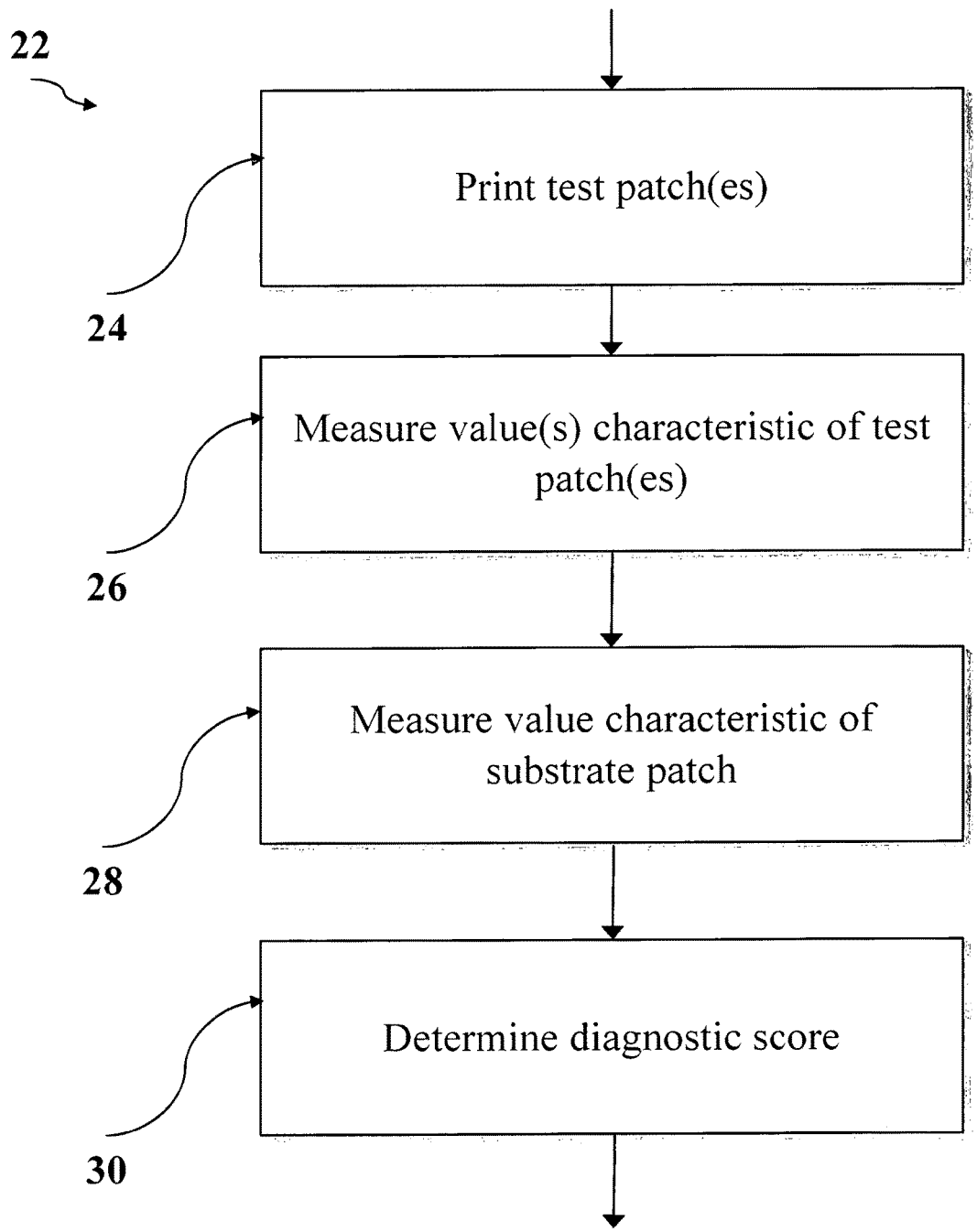
FIG. 6 is a flowchart illustrating an example method for diagnosing a spectrophotometer consistent with the present disclosure.

FIG. 6 illustrates an example method 22 for diagnosing a spectrophotometer, wherein values characteristic of test patches and a value characteristic of a substrate patch are measured sequentially (blocks 26, 28). For instance, the substrate patch value may server as a reference value for determining a diagnostic score based on the test patch value(s) (block 30).

Figure 7:
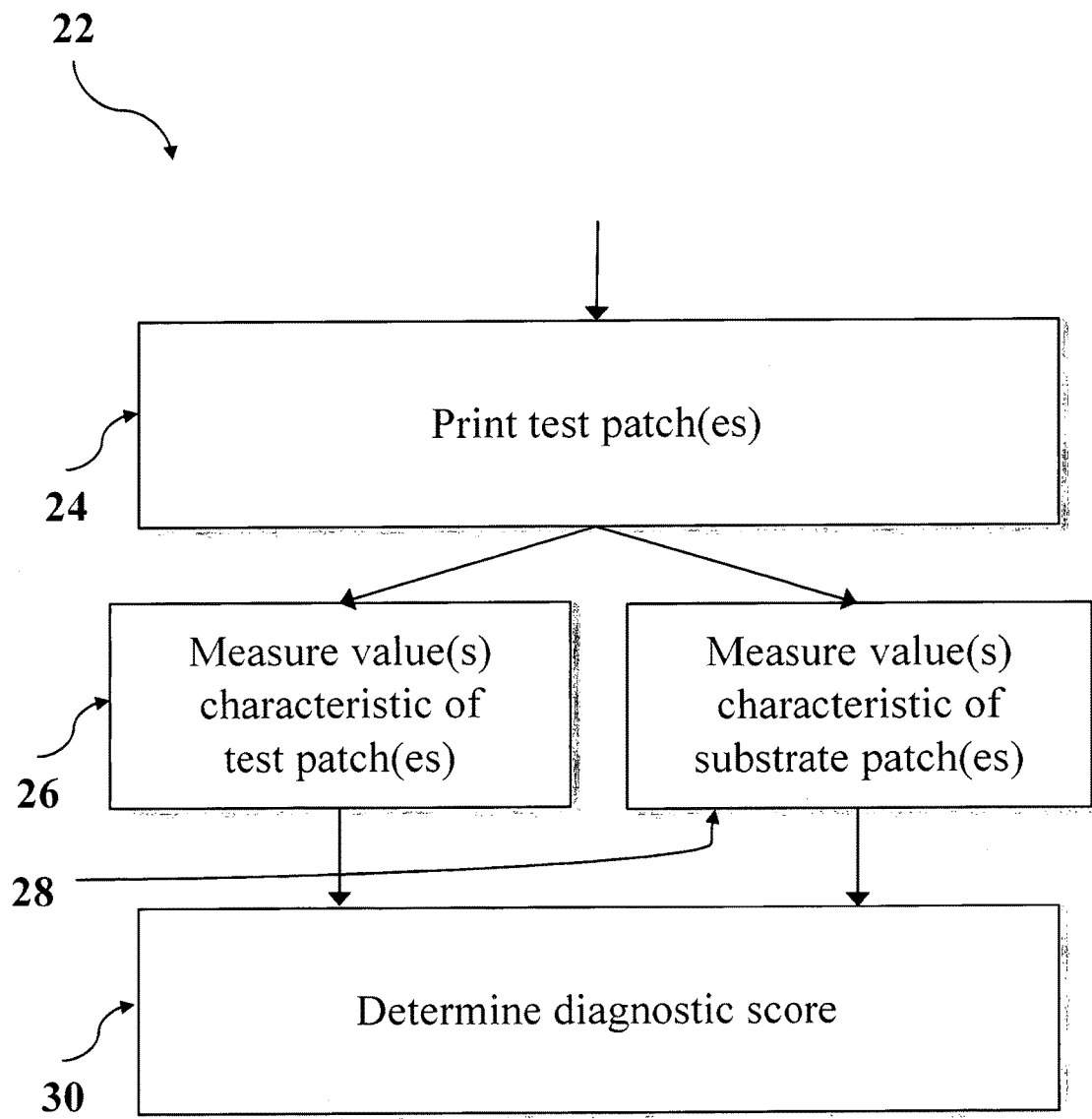
FIG. 7 is a flowchart illustrating an example method for diagnosing a spectrophotometer consistent with the present disclosure.

FIG. 7 illustrates an example method 22 for diagnosing a spectrophotometer, wherein values characteristic of test patches and a value characteristic of a substrate patch are measured concurrently (blocks 26, 28).

Figure 8:
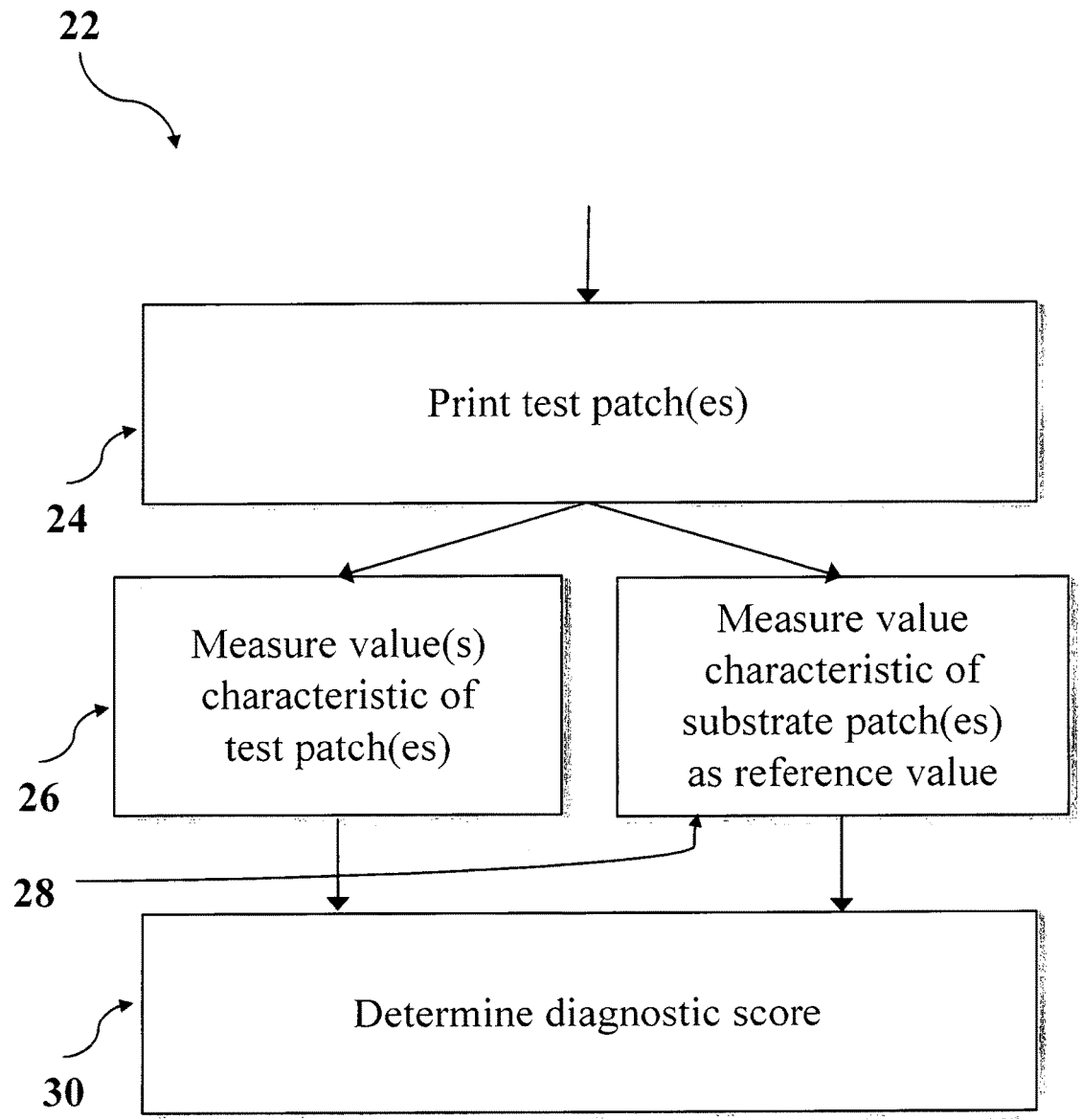
FIG. 8 is a flowchart illustrating an example method for diagnosing a spectrophotometer consistent with the present disclosure.

FIG. 8 illustrates an example method 22 for diagnosing a spectrophotometer, wherein a value characteristic of one or more substrate patches is measured (bock 28) and is used as a reference value for determining the diagnostic score (block 30) based on a value characteristic of one or more test patches. The method depicted in FIG. 8 illustrates an example of a consistency-type diagnosis. The determined diagnostic score is indicative of the consistency of the spectrophotometer measurements. For instance, printed test patches may show characteristic values which are different as compared to those of non-printed substrate patches. A well-functioning spectrophotometer would deliver consistent results, i.e. a difference in values of test and substrate patches. The role of reference value is ascribed to the substrate patches in the method shown. However, similar example methods may show a reversal of reference: The test patches may serve as reference value to determine the consistency of substrate patch measurements.

Figure 9:
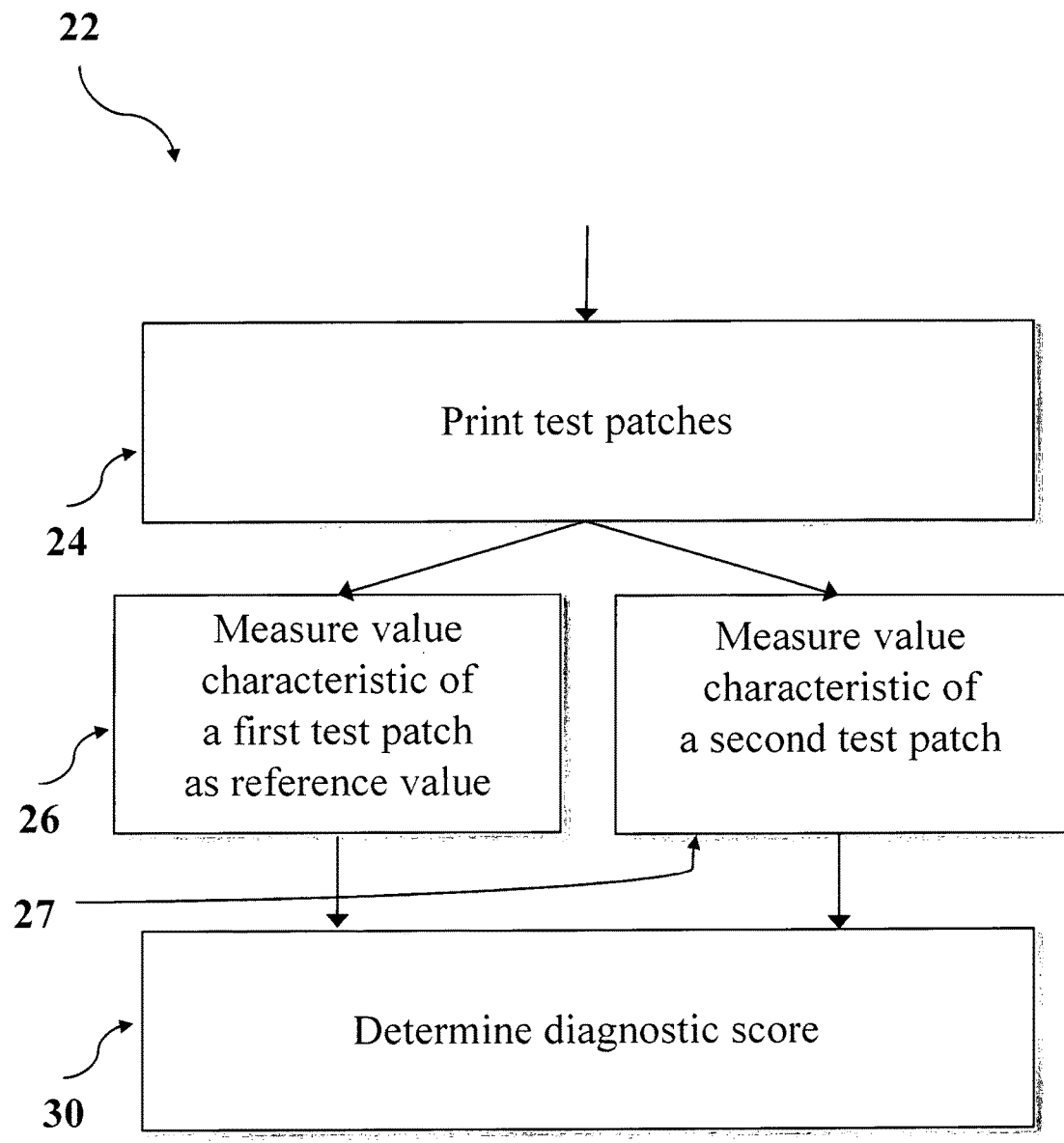
FIG. 9 is a flowchart illustrating an example method for diagnosing a spectrophotometer consistent with the present disclosure.

FIG. 9 illustrates an example method 22 for diagnosing a spectrophotometer, wherein a value characteristic of a first test patch is measured (block 26) and is used as a reference value for determining the diagnostic score (block 30) based on a value characteristic of a second test patch. The method depicted in FIG. 9 illustrates another example of a consistency-type diagnosis. The determined diagnostic score is indicative of the consistency of the spectrophotometer measurements. Two test patches with substantially identical features are investigated by the spectrophotometer. A well-functioning spectrophotometer would deliver consistent results, i.e. similar measured values for essentially identical patches. Similarly, in some examples, values characteristic of a first substrate patch and a second substrate patch may be measured for a consistency-type diagnosis of essentially identical substrate patches. For example, this method may be used in the case of spectrophotometer consistency possibly exceeding printing consistency.

The measurement of characteristic values may be performed repeatedly on one or more patches, which may lead to increased statistical significance.

Figure 10:
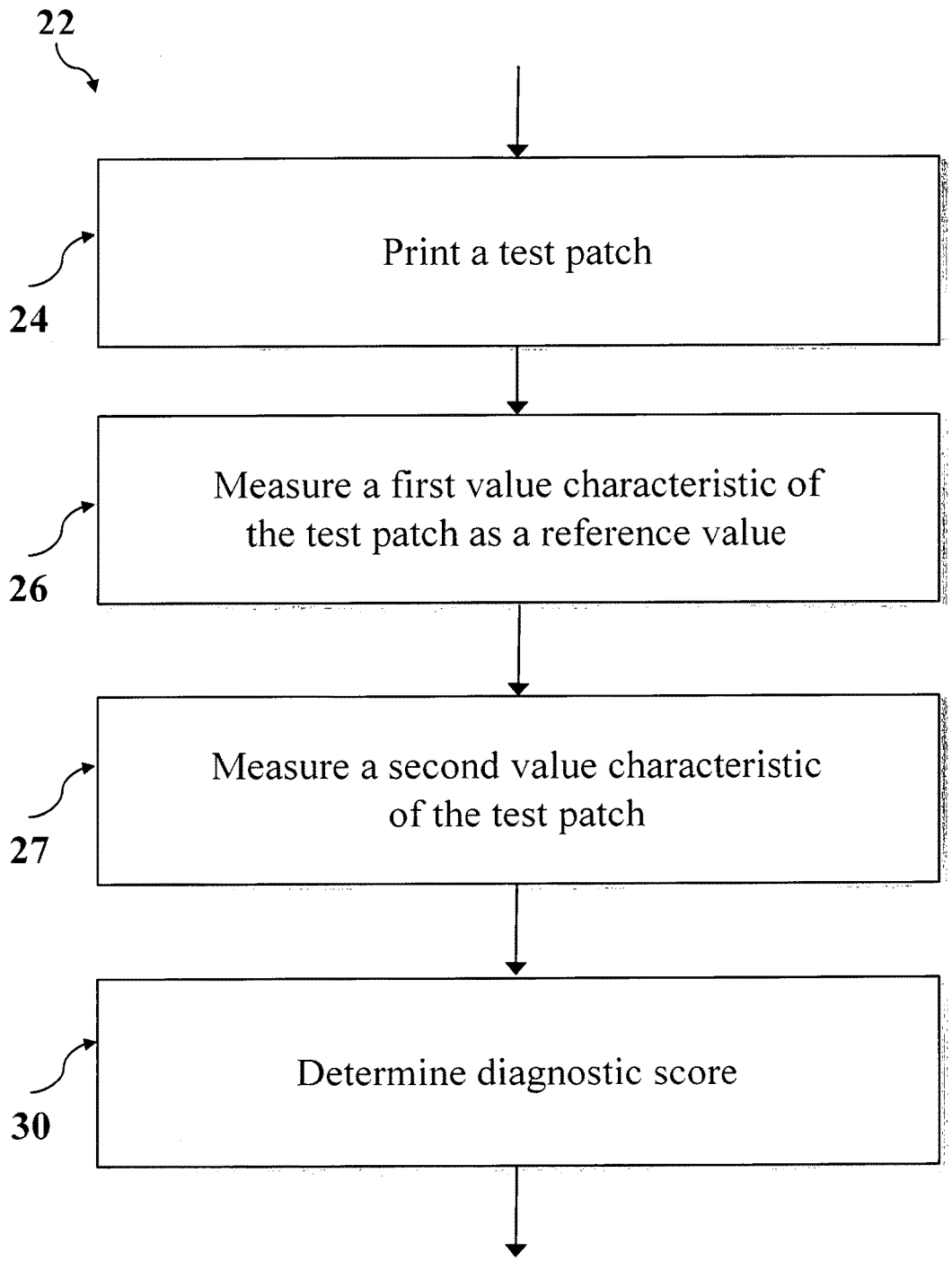
FIG. 10 is a flowchart illustrating an example method for diagnosing a spectrophotometer consistent with the present disclosure.

FIG. 10 illustrates an example method 22 for diagnosing a spectrophotometer, wherein a first value, characteristic of a test patch is measured (block 26) and is used as a reference value for determining the diagnostic score (block 30) based on a second value, measured as characteristic of the same test patch (block 27). For this method, at least one single test patch is printed. The method depicted in FIG. 10 illustrates an example of a repeatability-type diagnosis. The determined diagnostic score is indicative of the repeatability of the spectrophotometer measurements. The test patch investigated multiple times by the spectrophotometer is expected to yield substantially identical characteristic values. A well-functioning spectrophotometer would deliver repeatable results, i.e. similar measured values for the same patch. Similarly, a repeatability-type diagnosis may be performed on repeated measurements of values characteristic of substrate patch(es).

Figure 11:
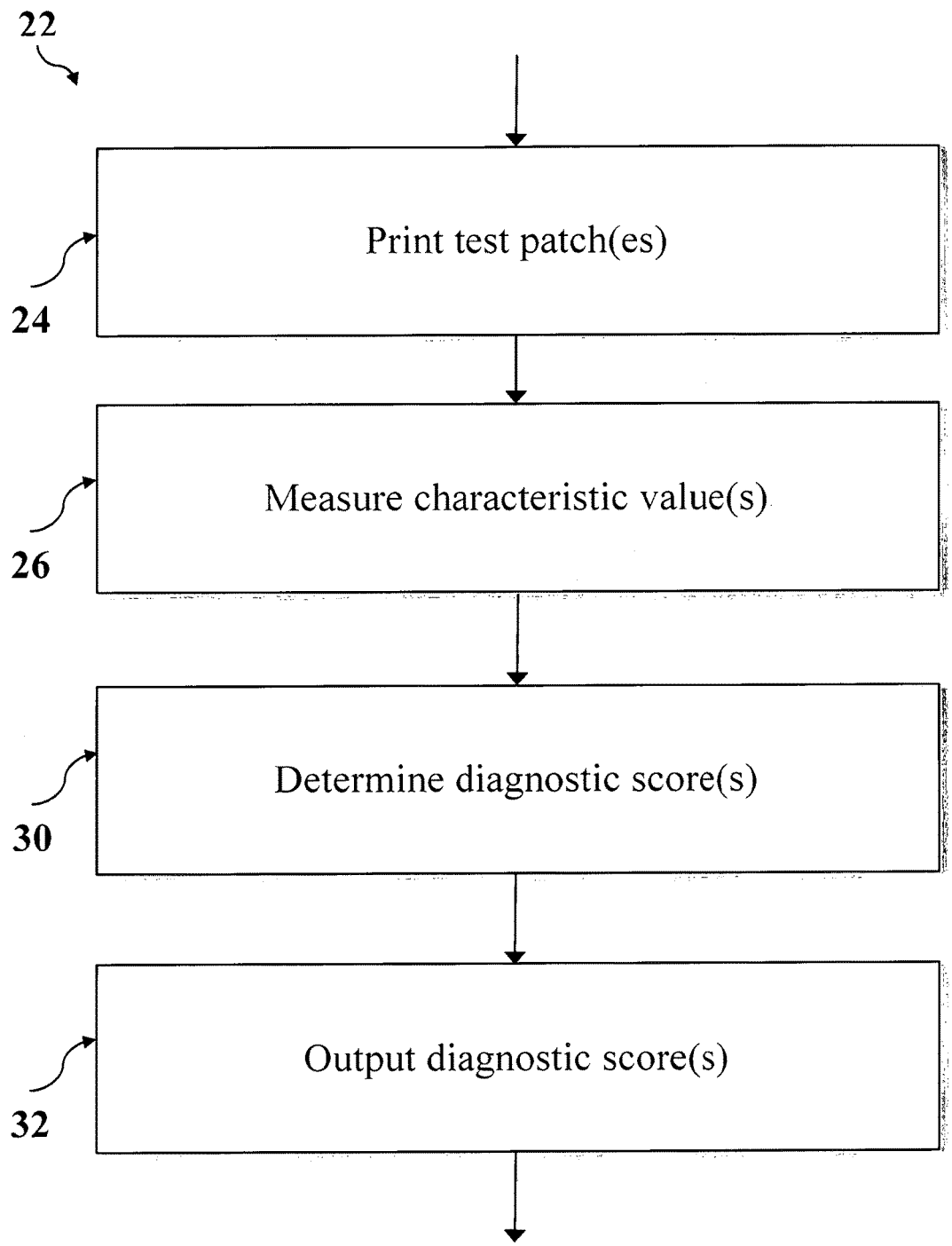
FIG. 11 is a flowchart illustrating an example method for diagnosing a spectrophotometer consistent with the present disclosure.

A series of additional actions may be performed during execution of a method according to the present disclosure. For instance, after determining at least one diagnostic score, the at least one diagnostic score may be output. FIG. 11 illustrates an example method 22 for diagnosing a spectrophotometer, wherein a diagnostic score is output (block 32). For instance, the output may occur onto a display of the printer in the form of an error message or via a communication channel in the form of an e-mail requesting service or in order to induce automatic spectrophotometer repair measures. The output may depend on the different components and configuration of the spectrophotometer diagnosis system or spectrophotometer. The output may lead to recalibration of the spectrophotometer. A recalibration may include recalibration of some or all of the spectrophotometer components. Recalibration may include restarting the computer monitoring the spectrophotometer position and triggering time, Recalibration may be carried out following manufacturer's instructions. Additionally or alternatively, the output may indicate to discontinue the usage of the spectrophotometer and replace it by another spectrophotometer.

Figure 12:
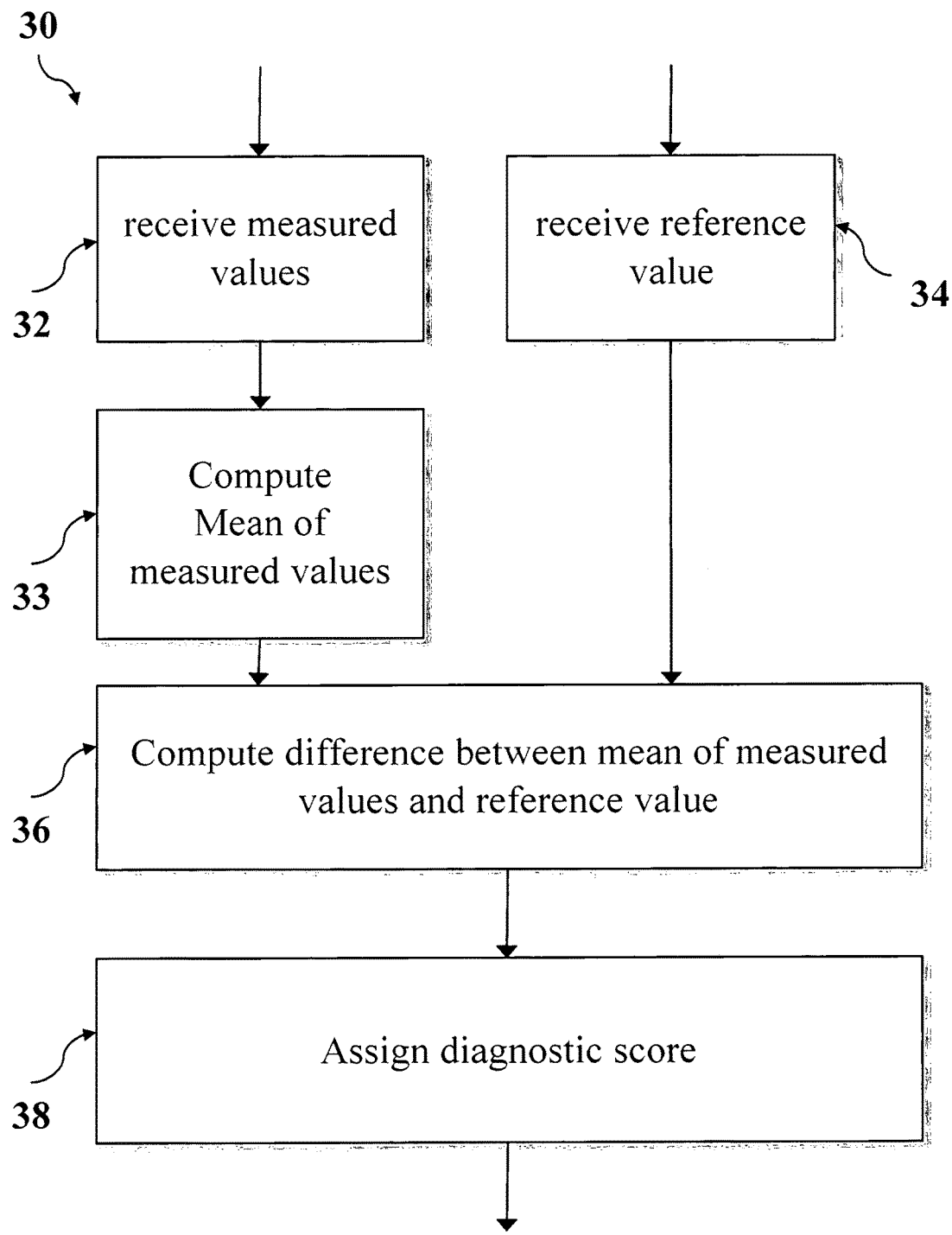
FIG. 12 is a flowchart illustrating an example of determining a diagnostic score consistent with the present disclosure.

Determining a diagnostic score may include a series of computations, depending on the type of diagnostic test, type of measurements, and/or type of patches. FIG. 12 illustrates determining (reference numeral 30) a diagnostic score comprising a series of computations for the case of multiple characteristic values previously measured on one or more test patches in combination with a single reference value, characteristic of a substrate patch. The measured test patch values are received (block 32). The reference value is received (block 34). The values may be received by a processing unit from the spectrophotometer. A mean value is computed on the basis of the received measured values (block 33). The difference between the mean of measured values and the reference value is computed (block 36). Additionally or alternatively, an absolute or relative difference may be computed. Based on the computed difference, a diagnostic score is assigned (block 38) to the set of measured values and reference value. A processing unit according to a system consistent with the present disclosure may be configured to process the computations shown in FIG. 12.

Figure 13:
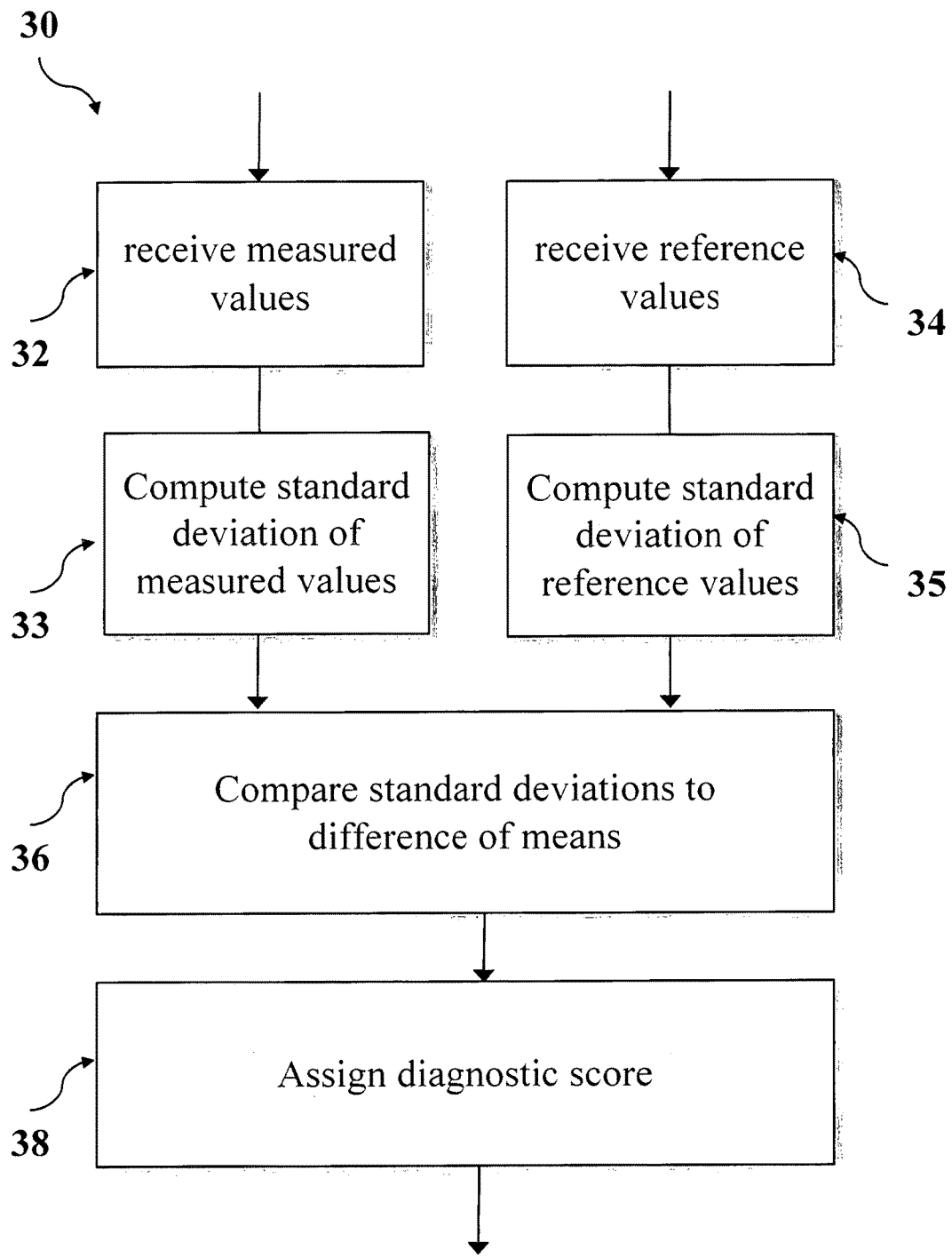
FIG. 13 is a flowchart illustrating an example of determining a diagnostic score consistent with the present disclosure.

FIG. 13 illustrates determining (reference numeral 30) a diagnostic score comprising another series of computations for the case of multiple characteristic values previously measured on one or more test patches in combination with multiple reference values, previously measured on one or more substrate patch(es). The measured test patch values are received (block 32). The reference values are received (block 34). The values may be received by a processing unit from the spectrophotometer. A standard deviation of measured test patch values is computed on the basis of the received measured test patch values (block 33). A standard deviation of reference values is computed on the basis of the received reference values (block 35). The standard deviations of measured test patch values and of reference values are compared to the difference of means of measured and reference values (block 36). Based on the comparison, a diagnostic score is assigned to the set of measured values and reference values (block 38). A processing unit according to a system consistent with the present disclosure may be configured to process the computations shown in FIG. 13.

Figure 14:
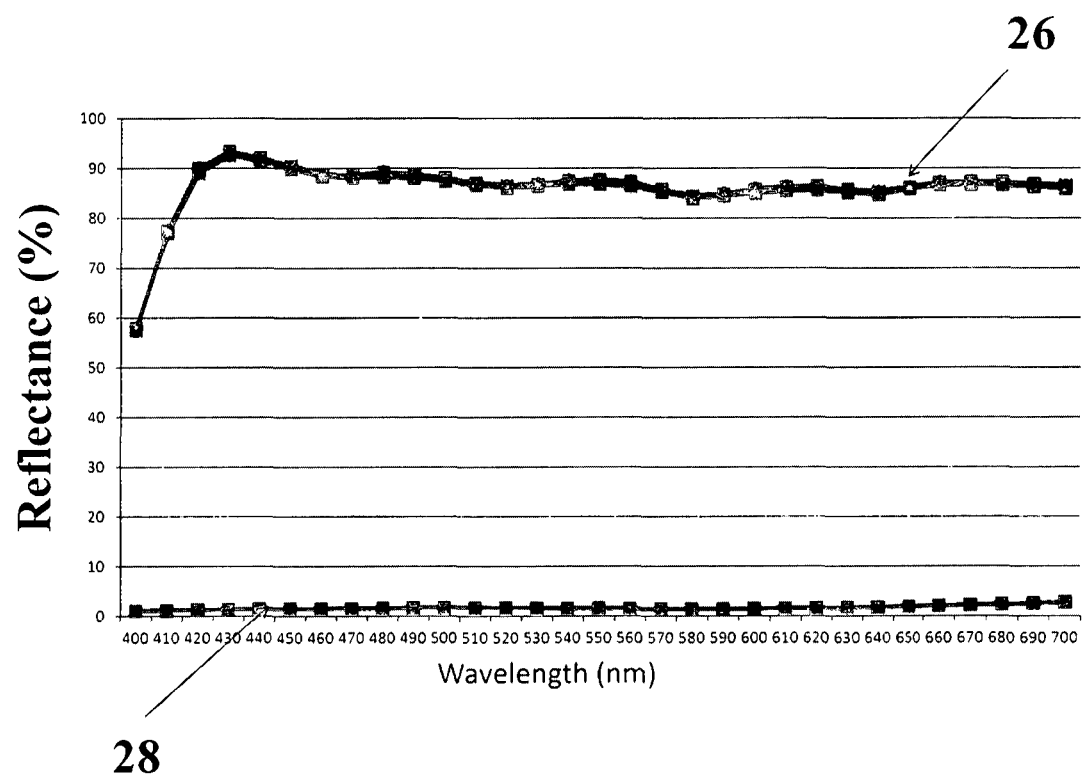
FIG. 14 is a graph displaying measurement results of values characteristic of patches.

FIG. 14 illustrates an example results of spectrophotometer measurement. The values shown are spectral distributions of reflectance, plotted against the corresponding wavelengths substantially in the visible range from 400 to 700 nm. Measurement 26 is an example value characteristic of an example non-printed substrate patch on a white substrate, which may serve as reference. Measurement 28 is an example value characteristic of a test patch printed in black. The measurement shown is an example of a consistency-type diagnosis of a well-functioning spectrophotometer.

The invention claimed is:

1. A method for diagnosing a spectrophotometer, comprising:
    printing at least one test patch, in proximity to at least one non-printed substrate patch,
    measuring at least one value characteristic of the at least one printed test patch and the at least one non-printed substrate patch using the spectrophotometer,
    determining at least one diagnostic score for the spectrophotometer based on the at least one measured value characteristic in comparison with a reference value,
    wherein the at least one determined diagnostic score comprises a score indicative of at least one of repeatability of measuring the at least one value characteristic using the spectrophotometer and consistency of measuring the at least one value characteristic using the spectrophotometer.

2. A method according to claim 1, wherein the measuring the at least one value characteristic is carried out repeatedly on the at least one printed test patch and the at least one non-printed substrate patch using the spectrophotometer.

3. A method according to claim 1, wherein determining the at least one diagnostic score comprises:
    computing at least one of a mean value and a standard deviation of multiple measurements of the at least one value characteristic of one or more of the printed test patches.

4. A method according to claim 1, wherein determining the at least one diagnostic score comprises:
    comparing the measured value characteristic of one or more printed test patches to the measured value characteristic of one or more non-printed substrate patches.

5. A method according to claim 1, wherein the measured value characteristic comprises at least one of a reflectance value, an optical density value and a color value.

6. A method according to claim 1, further comprising
    outputting a diagnosis based on the at least one determined diagnostic score.

7. A method according to claim 1, wherein the at least one printed test patch includes at least one of black-and-white patches, grayscale patches and color patches.

8. A method according to claim 1, wherein the measuring the at least one value characteristic is carried out sequentially on the at least one printed test patch and the at least one non-printed substrate patch using the spectrophotometer.

9. A method according to claim 1, wherein the measuring the at least one value characteristic is carried out concurrently on the at least one printed test patch and the at least one non-printed substrate patch using the spectrophotometer.

10. A method according to claim 1, wherein determining the at least one diagnostic score is based on the measured value characteristic of the at least one printed test patch, and wherein the reference value comprises the measured value characteristic of the at least one non-printed substrate patch.

11. A method according to claim 1, wherein determining the at least one diagnostic score is based on the measured value characteristic of one printed test patch, and wherein the reference value comprises the measured value characteristic of another printed test patch.

12. A method according to claim 1, wherein determining the at least one diagnostic score is based on the measured value characteristic of one measuring of the at least one printed test patch, and wherein the reference value comprises the measured value characteristic of another measuring of the at least one printed test patch.

13. A spectrophotometer diagnosis system comprising:
a printer to print at least one test patch, in proximity to at least one non-printed substrate patch,
a spectrophotometer to measure at least one value characteristic of the at least one printed test patch and the at least one non-printed substrate patch,
wherein at least one diagnostic score for the spectrophotometer is based on the at least one measured value characteristic in comparison with a reference value,
wherein the at least one diagnostic score comprises a score indicative of at least one of repeatability of the spectrophotometer in measuring the at least one value characteristic and consistency of the spectrophotometer in measuring the at least one value characteristic.

14. A system according to claim 13, wherein the at least one printed test patch includes at least one of black-and-white patches, grayscale patches and color patches.

15. A system according to claim 13, wherein the measured value characteristic comprises at least one of a reflectance value, an optical density value and a color value.

16. A system according to claim 13, wherein the spectrophotometer is to sequentially measure the at least one value characteristic of the at least one printed test patch and the at least one non-printed substrate patch.

17. A system according to claim 13, wherein the spectrophotometer is to concurrently measure the at least one value characteristic of the at least one printed test patch and the at least one non-printed substrate patch.

18. A system according to claim 13, wherein the at least one diagnostic score is based on the measured value characteristic of the at least one printed test patch, and wherein the reference value comprises the measured value characteristic of the at least one non-printed substrate patch.

19. A system according to claim 13, wherein the at least one diagnostic score is based on the measured value characteristic of one printed test patch, and wherein the reference value comprises the measured value characteristic of another printed test patch.

20. A system according to claim 13, wherein the at least one diagnostic score is based on the measured value characteristic of one measure of the at least one printed test patch, and wherein the reference value comprises the measured value characteristic of another measure of the at least one printed test patch.

* * * * *